March 12, 1957  J. W. THOMSON, JR  2,784,832
VERTICAL CONVEYING APPARATUS
Filed Jan. 19, 1955  3 Sheets-Sheet 1
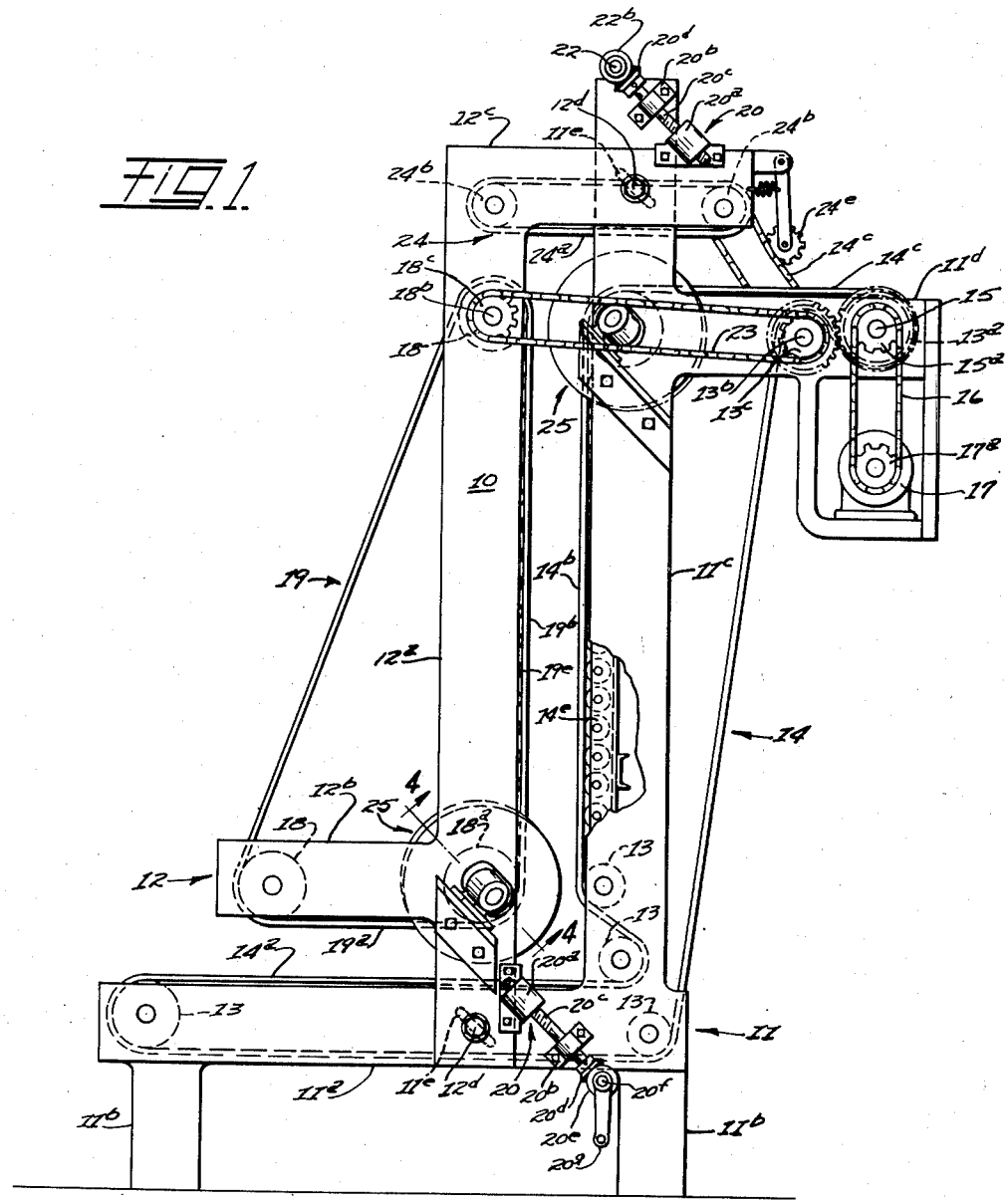
INVENTOR
JOHN W. THOMSON, JR.
BY
Schuch & Hoge
ATTORNEYS March 12, 1957  J. W. THOMSON, JR  2,784,832
VERTICAL CONVEYING APPARATUS
Filed Jan. 19, 1955  3 Sheets-Sheet 2

INVENTOR
JOHN W. THOMSON, JR.
BY
*Schauck & Hoge*
ATTORNEYS

March 12, 1957  J. W. THOMSON, JR  2,784,832
VERTICAL CONVEYING APPARATUS
Filed Jan. 19, 1955   3 Sheets-Sheet 3
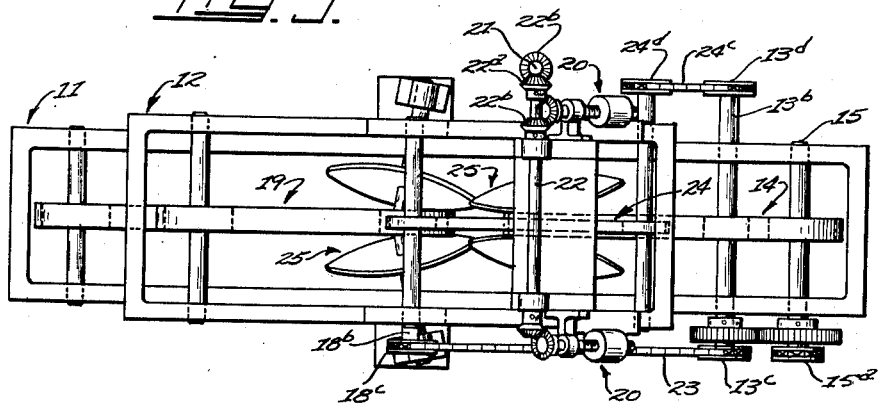
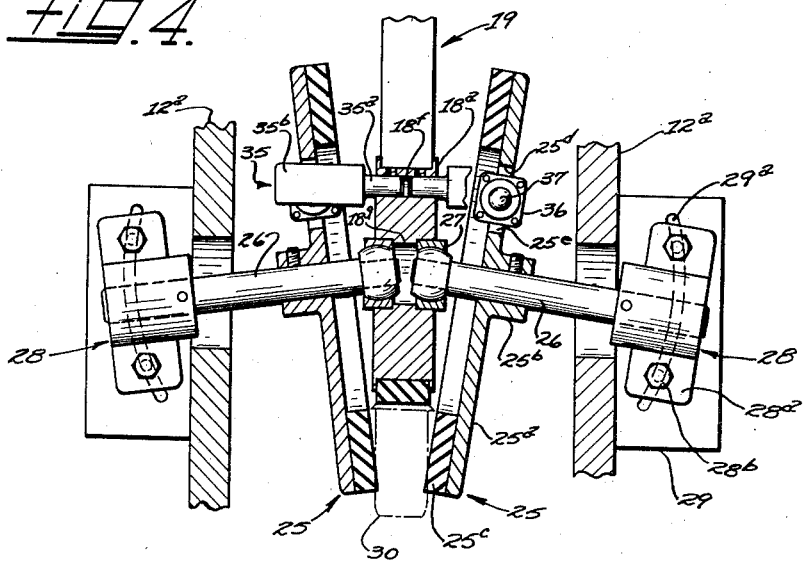
INVENTOR
JOHN W. THOMSON, JR.
BY
ATTORNEYS United States Patent Office 2,784,832
Patented Mar. 12, 1957

2,784,832

VERTICAL CONVEYING APPARATUS

John W. Thomson, Jr., Menlo Park, Calif., assignor to Owens-Illinois Glass Company, a corporation of Ohio Application January 19, 1955, Serial No. 482,838

5 Claims. (Cl. 198—165)

This invention relates to conveying apparatus, and particularly to a belt-type conveyor for effecting a change in elevation of a series of articles being conveyed.

In many industries, and particularly in the glass container industry, it is necessary to convey successive series of articles by the same conveying apparatus wherein the articles of the successive series may vary substantially in size and/or configuration. For example, in the glass container industry, it is sometimes desirable that the same conveyor be utilized to effect the movement of wide-mouth glass containers of sizes ranging from one-half pint to quart capacity, and it often becomes necessary that the same conveyor be used to convey tumblers which commonly have a substantially tapered external configuration. So long as the conveying path lies in a horizontal plane, no particular difficulty is encountered in adapting the conveyor to such wide ranges of size and shape. However, in many factory layouts, it is often necessary to substantially change the elevation of the conveyor in either an upward or downward direction and at this point, great difficulty has been encountered in providing a conveyor for successive series of glass articles which will not only accommodate a range of sizes or shapes but will also effect the change in elevation of the glass articles without bumping of the adjacent articles together and the attendant risk of producing chipping or breakage of the articles.

Accordingly, it is an object of this invention to provide an improved conveyor for changing the elevation of successive series of conveyed articles, wherein the articles of the successive series may vary substantially in size or configuration, characterized by the provision of means effecting the rapid and convenient adjustment of the conveyor to conform to the size of the articles being conveyed.

A particular object of this invention is to provide an improved conveyor construction for effecting a change in elevation of glass articles wherein such articles are conveyed in such manner as to eliminate the possibility of jostling or bumping of the successive glass articles.

The specific nature of this invention as well as other objects and advantages thereof, will become apparent to those skilled in the art from the following detailed description, taken in conjunction with the annexed sheets of drawings on which there is shown, by way of preferred example only, one embodiment of this invention.

On the drawings:

Figure 1 is a side elevational view of a vertical conveying apparatus embodying this invention.

Figure 2 is an end elevational view of the apparatus of Figure 1.

Figure 3 is a plan view of the apparatus of Figure 1.

Figure 4 is an enlarged scale sectional view taken on the plane 4—4 of Figure 1.

Figure 5 is a schematic view of the apparatus of Figure 1 illustrating the manner in which articles are handled by the conveying apparatus.

As shown in the drawings:

The apparatus embodying this invention is particularly designed for effecting a change in elevation of a series of identical conveyed articles, such as glass containers. A conventional apparatus of any well-known type may be employed to effect the transfer of such series of articles into the input end of the elevating apparatus and to remove the articles from the output end of the elevating apparatus. Since such cooperating apparatus is entirely conventional and well-known, it has not been described or illustrated.

A vertical conveyor embodying this invention is illustrated generally by the numeral 10 and comprises a pair of cooperating frame structures 11 and 12. Frame structure 11, which will hereinafter be referred to as the base frame structure, includes a horizontal table portion 11a supported by a plurality of depending legs 11b. Adjacent one edge of table portion 11a a vertical column structure 11c is mounted. Adjacent the top portion of column 11c a horizontally extending cantilever frame structure 11d is provided. A plurality of conveyor belt rollers 13 are journalled on base frame 11 in such manner so that when a belt 14 is trained therearound, the belt defines a lower horizontally extending flight 14a which is disposed in substantial alignment with the table 11a, vertically extending flight portion 14b which runs in general parallelism to the vertical column 11c and an upper horizontally extending flight 14c which extends in substantial parallelism with the cantilever frame 11d. Any one of the pulleys 13 as desired may be utilized as a driving pulley for the belt 14, and in the embodiment shown in the drawings, the pulley 13a mounted at the outer extremity of cantilever frame 11d is utilized as the driving pulley, being mounted on a shaft 15 which is in turn driven by a sprocket 15a (Fig. 2), chain 16 and the output sprocket 17a of a motor driven speed reducing unit 17.

The secondary frame structure 12 includes a vertical column portion 12a, a lower cantilever frame 12b and an upper cantilever frame portion 12c. The cantilever frame portions 12b and 12c respectively project in opposite directions from the column portion 12a. The overall configuration of secondary frame structure 12 conforms closely to that of the primary frame structure 11 so that whenever the lower cantilever frame portion 12b of the secondary frame 12 is vertically spaced a selected distance above the table portion 11a of the base frame structure 11, then the upper cantilever frame portion 12c of the secondary frame 12 will be spaced a substantially equal distance above the cantilever frame structure 11d of the base frame 11.

A plurality of belt idler pulleys 18 are journalled in suitably spaced relationship on secondary frame structure 12 so that when a conveyor belt 19 is entrained therearound, such belt defines a lower horizontal flight 19a moving in parallelism with the lower horizontal flight 14a of belt 14 and a vertical flight 19b moving in parallelism with the vertical flight 14b of the belt 14.

Pulleys 18 may be driven in any desired fashion so that belt 19 moves in synchronism with belt 14. For example, a sprocket 13c may be mounted on the shaft 13b which journals one of the pulleys 13 and a chain 23 used to connect such sprocket with a second sprocket 18c mounted on one of the shafts 18b supporting one of the pulleys 18.

Additionally, an upper horizontal belt flight 24a is defined by a belt 24 which is trained over two horizontally spaced pulleys 24b journalled on and in parallelism with the upper cantilever frame structure 12c. The flight 24a thus overlies the upper horizontal belt flight 14c of the belt 14. The belt 24 is driven by a chain connection 24c cooperating with a sprocket 13d (Fig. 2) on shaft 13b and a sprocket 24d on the same shaft as one of the pulleys 24b. A spring pressed or otherwise adjustable idler sprocket 24e permits the chain 24c to conform to varying spacing of frames 11 and 12.

At least one of the belts 14 and 19 are formed of resilient material of substantial thickness, or, alternatively, of belting with a facing of resilient or rubber-like material. Hence a fragile article may be firmly grasped between two cooperating belt flights without danger of injury.

In accordance with this invention, the physical connection between the base frame structure 11 and the secondary frame structure 12 is defined by a plurality of pin-and-slot type connections which may, for example, comprise a slot 11e formed in the base frame structure 11 and a bolt 12d passing through the secondary frame structure 12 and cooperating with such slot. Preferably, two such pin-and-slot type connections are provided, one being located in the table portion 11a of the base frame structure 11, and the second being located at the top of the vertical column portion 11c of the base frame structure 11. Furthermore, and most important, the slots 11e of the pin-and-slot connection are positioned so that their length axis makes equal angles respectively with the horizontal and vertical exending flight portions of the conveyor belts 14 and 19. In the specific example illustrated in the drawings where the horizontally and vertically extending flight portions are mutually perpendicular, the slots 11e are thus disposed at a 45° angle with respect to the vertical.

It is, therefore, apparent that the secondary frame structure 12 may be adjustably positioned relative to the base frame structure 11 along the path defined by the length of the slots 11e and that at any position along such path, the spacing between the horizontal portions of the conveyor belts 14 and 19 will be maintained substantially identical with the spacing between the vertical portions of the belts 14 and 19.

To effect the convenient manual adjustment of such conveyor belt spacing, this invention provides one or more threaded connections 20 between the secondary frame structure 12 and the base frame structure 11. Each threaded connection 20 comprises an internally threaded housing 20a secured to one of the cooperating frame structures and a bearing 20b secured to the other frame structure. Bearing 20b journals the bolt element 20c of the threaded connection and prevents axial movement of such bolt element which is threadably engaged with the housing 20a. To facilitate the manual adjustment of threaded bolt element 20c, a bevel gear 20d may be provided on one end thereof, which cooperates with a similar bevel gear 20e mounted on a shaft 20f journalled on the frame structure and having a crank end 20g. In the specific embodiment illustrated in the drawings, four such threaded connections 20 are provided, two of them being respectively located at opposite sides of the lower portion of the secondary frame 12, and two being respectively located at opposite sides of the upper portion of secondary frame 12. The crank driven shaft 20f preferably carries an additional bevel gear 20h at its other extremity which cooperates with a bevel gear 21a mounted on the end of a vertical shaft 21 carrying a bevel gear 21b at its top end. Bevel gear 21b cooperates with a bevel gear 22a on a horizontal shaft 22 which, in turn, drives the two top threaded connections 20 by bevel gears 22b. Accordingly, the manual rotation of crank driven shaft 20f will effect a concurrent and equal adjustment in both a horizontal and vertical direction of the secondary frame structure 12 relative to the base frame structure 11.

To avoid lateral displacement of the vertical belt flights 14b and 19b, a plurality of rollers 14e and 19e are respectively journalled in columns 11c and 12a behind vertical flights 14b and 19b.

In order to effect the transfer of articles from the cooperating lower horizontal belt flights 14a and 19a to the cooperating vertical flights 14b and 19b, this invention provides a pair of disk-like conveying elements 25 which are respectively mounted in opposed relationship on the secondary frame structure 12 in such position that their peripheral portions overlap the juncture of the horizontal and vertical belt flights. As best shown in Figure 4, the disk-like conveying elements 25 are of identical construction comprising a rigid disk-shaped element 25a having a hub portion 25b mounted on and secured to a shaft 26. One end of shaft 26 is journalled by cantilever type, anti-friction bearing unit 28 which includes a housing having a mounting flange 28a with suitable holes therein traversed by bolts 28b. A 45° inclined bearing mounting flange 29 is suitably secured to the vertical column 12a and is provided with an arcuate slot 29a to receive the mounting bolts 28b.

The other end of each shaft 26 mounts a spherical-type bearing unit 27 which is inserted in a central hole 18g in the pulley 18a that guides the belt 19 at the juncture of the horizontal and vertical belt flights 19a and 19b. The pulley 18a is thus supported by the two shafts 26 of the cooperating disk-like conveying elements 25. Rotary movement is imparted to the disk-like conveying elements 25 by virtue of a pair of paddles 35 which have stem portions 35a respectively mounted in an axially extending hole 18f formed near the perimeter of pulley 18a and have relatively flat rectangular blade portions 35b respectively projecting through apertures 25d formed in the disk-shaped elements 25a. On one wall 25e of such apertures 25d, a bearing unit 36 is mounted which supports and journals a contact ball 37. Since pulley 18a is driven by belt 19, the paddles 35 impart identical angular rotation respectively to the disk-shaped conveying elements 25a by virtue of their engagement by the contact balls 37.

The cantilever type outboard bearings 28 for the shafts 26 are adjustable by virtue of the arcuate mounting slots 29a, so as to permit each of the conveying disk elements 25 to be canted relative to the other disk so that the portion of their peripheries which overlaps the juncture of the horizontally and vertically extending flights of belt 19 will define a minimum separation of such conveying disks. The centers of arcuate slots 29a are designed to correspond to the center point on the axis of belt pulley 18a. This canted relationship of the conveying disks 25 relative to the pulley 18a necessarily means that the contact roller 36 will cyclically shift relative to the paddles 35 during each rotational cycle and the flat blade portions 35b of paddles 35 are designed with sufficient area to accommodate such change in relative position of the contact roller 36. Thus, the driving of the disk-like conveying elements 25 is accomplished in exact synchronism with the rotation of belt roller 18a and with a minimum of frictional losses. Preferably, an annular band of resilient or rubber-like material 25c is provided on the opposed faces of the conveying disk 25a and the minimum spacing of such disks are adjusted for each size or shape of conveyed article so that the conveyed articles are firmly grasped between the cooperating resilient bands 25c.

An exactly similar set of conveying disk elements 25 are provided at the juncture of the top horizontal belt portion 14c with the vertically extending belt portion 14b and this pair of conveying disks serves to grasp the articles being elevated at the top end of the cooperating vertical belt flights 14b and 19b and transfer them to the upper horizontally extending belt flights 14c and 24a.

The operation of the conveying apparatus embodying this invention may be best understood by reference to the schematic illustration of the apparatus shown in Figure 5. In the following description, it will be assumed that the respective belts are driven in such a direction as to effect an increase in elevation of the articles being conveyed. Obviously, articles may be lowered by the same apparatus by the simple expedient of reversing the direction of belt travel. The articles to be conveyed are represented by a series of tumblers 30 which are assumed to be fed in spaced sequence onto the extreme left-hand or input end of the lower horizontal flight portion 14a of the belt 14 by conventional apparatus. The spacing between the cooperating belts 14 and 19 is adjusted by changing the spacing of frames 11 and 12 so that such belts will firmly hold the article therebetween. Thus, the tumblers 30 are then held in their original spaced relationship and moved laterally toward the right by the cooperating belt flights 14a and 19a until they reach the corner pulley 18a. At this point, the tumblers 30 would tend to move out of contact with the belt 19 but instead, they are firmly grasped by the resilient peripheral portions of the cooperating conveying disks 25a and are moved by such disks around the periphery of corner belt pulley 18a and into the nip defined by the cooperating vertical belt portions 14b and 19b. As previously mentioned, the spacing between such vertical belt portions is the same as between the horizontal belt portions so that the tumblers 30 are firmly held between the vertical belt portions 14b and 19b. Any tendency of such belt portions to deflect away from the tumblers 30 is resisted by the cooperating sets of vertical rollers 19e and 14e. At the top end of the vertical belt portions 14b and 19b, prior to the release of a particular tumbler 30 by such belt portions, the tumbler 30 is firmly grasped by the spaced resilient bands 25c of the cooperating upper conveying disks 25a and are transferred by the upper set of conveying disks 25a to enter the nip defined by the upper conveyor belt flights 14c and 24a. The articles are then removed from the end of the upper horizontal flight 14c by conventional conveying apparatus.

It should be particularly noted that the described apparatus maintains the same spacing of the articles as they had entering the apparatus throughout the change in elevation of such articles, and that this maintenance of spacing is accomplished without the use of article engaging sprocket wheels or helix worms which have been heretofore believed to be essential. Maintenance of the spacing of the articles is of particular importance when the described apparatus is employed for conveying of relatively fragile articles such as glass containers.

Whenever it is desired to adapt the described apparatus to convey articles of a different size, it is only necessary to operate the crank 20g to effect the desired adjustment of spacing vertically and horizontally extending belt flights and to adjust the position of the outboard bearings 28 of the cooperating conveying disk elements 25 to adjust the minimum separation of such disk elements to conform to the size of the new series of articles to be conveyed.

It will, of course, be understood that various details of construction may be modified through a wide range without departing from the principles of this invention, and it is, therefore, not the purpose to limit the patent granted hereon otherwise than necessitated by the scope of the appended claims.

I claim:

1. Apparatus for changing elevation of successive series of successive articles, where all articles of any particular series are of the same size but articles of successive series may vary in size, comprising a pair of frame structures each having a vertically extending portion and a horizontally extending portion, endless belt conveyor means mounted on each of said frame structures and respectively defining a vertically extending flight and a horizontally extending flight on each frame structure, connecting means positioning said frame structures relative to each other to respectively align said vertically extending flights and said horizontally extending flights in parallel, equi-spaced relationship, and manually operated means for selectively adjusting the relative position of said frame structures along a path making equal angles with both said horizontally and vertically extending flights, whereby the effective spacing between all cooperating belt flights may be concurrently equally varied to accommodate successive series of articles to be elevated.

2. The combination defined in claim 1 wherein said connecting means comprises a pin-and-slot connection between said frame structures and said manually operated means comprises a manually rotatable threaded connection between said frames having its thread axis parallel to said slot.

3. The combination defined in claim 1 plus a pair of disk-like conveying elements mounted in spaced, opposed relationship at the juncture of said horizontally and vertically extending conveyor flights, means for rotating said conveying elements, means for adjusting the relative inclination of the rotational axes of said conveying elements to proportion the minimum separation of said conveying elements to conform to the thickness of the articles conveyed, said minimum separation being located at the juncture of said horizontally and vertically extruding conveyor flights, whereby said disk-like carrying elements effect the transfer of articles between said horizontal and vertical conveyor flights.

4. The combination defined in claim 3 wherein each of said conveying elements comprises a shaft and a rigid disk secured to the central portions of said shaft, an annular band of resilient material secured to the article adjacent face of said disk, and an arcuately adjustable bearing journalling said shaft, said bearing being adjustable in a plane parallel to said path.

5. In a belt conveying apparatus having angularly disposed connecting flights and a belt roller disposed at the juncture of said flights, a pair of disk-like conveying elements journalled in spaced opposed relationship adjacent said belt roller with their rotational axes intersecting at a central point on the rotational axis of said belt roller, said conveying elements being canted relative to each other to define a minimum separation zone at said flight juncture, and means for drivingly connecting said belt roller to each of said conveying elements, said last mentioned means comprising a pair of blades axially projecting from said belt roller respectively into recesses in said conveying elements, and a ball journalled in each of said recesses providing rolling contact with the corresponding one of said blades.

References Cited in the file of this patent
UNITED STATES PATENTS
2,593,627     Stover _____ Apr. 22, 1952